United States Patent
Namiki et al.

(10) Patent No.: US 6,769,520 B2
(45) Date of Patent: Aug. 3, 2004

(54) DAMPER AND METHOD OF FABRICATING THE DAMPER

(75) Inventors: Shinpei Namiki, Tokyo (JP); Kenji Takahashi, Tokyo (JP)

(73) Assignee: Tok Bearing Co., Ltd., Tokyo (JP)

( * ) Notice: Subject to any disclaimer, the term of this patent is extended or adjusted under 35 U.S.C. 154(b) by 0 days.

(21) Appl. No.: 10/074,905

(22) Filed: Nov. 13, 2001

(65) Prior Publication Data

US 2002/0125087 A1 Sep. 12, 2002

(30) Foreign Application Priority Data

Nov. 15, 2000 (JP) ......................................... 2000-347879

(51) Int. Cl.[7] ................................................ F16D 57/00

(52) U.S. Cl. ........................................ 188/290; 188/307

(58) Field of Search ................................. 188/290, 296, 188/306, 307; 267/141.1, 141.2, 140.4, 140.3, 140.12, 140.13

(56) References Cited

U.S. PATENT DOCUMENTS

| | | | | |
|---|---|---|---|---|
| 3,642,268 A | * | 2/1972 | Hipsher | 267/140.12 |
| 4,674,608 A | * | 6/1987 | Morris et al. | 188/290 |
| 4,687,188 A | * | 8/1987 | Knurek et al. | 267/140.13 |
| 4,768,630 A | * | 9/1988 | Aubry et al. | 188/290 |
| 5,660,254 A | * | 8/1997 | Spoto | 188/290 |
| 5,868,384 A | * | 2/1999 | Anderson | 267/141.1 |
| 6,390,255 B2 | * | 5/2002 | Kobori et al. | 188/290 |

* cited by examiner

*Primary Examiner*—Douglas C. Butler
*Assistant Examiner*—Melanie Torres
(74) *Attorney, Agent, or Firm*—Steinberg & Raskin, P.C.

(57) ABSTRACT

A damper including a shaft member 2 having wings 4a, 4b which are formed on the outer periphery of a shaft 3, a cylindrical casing 1 relative-rotatably incorporating the shaft member, and oil chambers A to D which are provided between the outer periphery of the shaft member and the inner periphery of the casing. Protrusions are provided on the inner periphery of the casing so as to be slidable on the outer periphery of the shaft. Communicating paths 5a, 5b pass through the shaft to enable communication between a pair of adjacent oil chambers. At least one of openings of the communicating path is closed by the protrusion 8a, 8b of the casing within a relative-rotating range of the shaft member 2.

5 Claims, 15 Drawing Sheets

DAMPER AND METHOD OF FABRICATING THE DAMPER

BACKGROUND OF THE INVENTION

1. Field of the Invention

This invention relates to a damper which is mounted inside a hinge in order to prevent a cover, e.g. a keyboard cover of a piano, a seat of a toilet, from quickly and forcefully closing because of its own weight when a hand is moved off the cover or from falling while being open.

2. Description of Related Art

Some dampers for adjusting rotating torque of a shaft member include a valve mechanism between a shaft and a casing for varying in torque depending on a direction of rotating the shaft or the casing. However, the damper including the valve mechanism in the casing has a complicated structure, a higher number of parts, and a higher number of processing steps, which has poor productivity. For that, some dampers do not have a valve mechanism as illustrating in FIG. 9.

Referring FIG. 9, a damper has a casing 1, a rotating shaft 2 mounted in the casing 1, and a viscous fluid contained between the rotating shaft 2 and the casing 1. Based on a relative rotation of the rotating shaft 2 or the casing 1, the flow resistance occurring in a flow path is changed in value in order to change the rotating torque, resulting in the lessened impact.

As illustrated in FIG. 9, wings 13, 14 are formed on the rotating shaft 2. The rotating shaft 2 has outer diameters of which sizes are varied between the wings 13, 14.

The casing 1 has a largest inner diameter in the vertical direction of FIG. 9, and protrusions 15, 16 protrude inward from the inner face of the casing 1 in the lateral direction.

Therefore, as the rotating shaft 2 rotates in the direction of the arrow in FIG. 9 to allow the wings 13, 14 to approach the protrusions 15, 16, the flow paths 17, 18 between the leading ends of the respective wings 13, 14 and the inner periphery of the casing 1 are narrowed. This is because the wings 13, 14 move to the smaller portions of the inner diameter of the casing 1.

Further, as the larger diameter parts of the rotating shaft 2 also approach the protrusions 15, 16, the flow paths 19, 20 are also narrowed. Accordingly, with the rotation of the rotating shaft 2 in the direction of the arrow in FIG. 9, the rotating torque increases. It should be noted that, as in the above case, the torque increases when the rotating shaft 2 rotates from the state illustrated in FIG. 9 in the opposite direction of the arrow.

Specifically, in the event that the wing 13 moves in the range from the protrusion 16 to the protrusion 15, the rotating torque decreases gradually from a larger torque value, and then increases again. Then, the rotation stops when the wing 13 comes into contact with the protrusion 15.

Such a damper is used with a need for higher torque around the starting point and around the ending point of rotation to suppress an abrupt rotation, and for rotation with lower resistance in the middle.

The damper illustrated in FIG. 9 controls a magnitude of the rotating torque by use of flow resistance created between the inner periphery of the casing 1 and the wings 13, 14 or between the protrusions 15, 16 and the outer diameter face of the rotating shaft 2. The flow resistance depends on a sectional area of the flow path. For this reason, an inner diameter of the casing 1 and an outer diameter of the rotating shaft 2 are varied complicatedly. It is difficult to form parts in such complicated configuration. This produces difficulties in forming the casing 1 and the rotating shaft 2 with accuracy. If each of the parts does not have a constant configuration, the assembled damper can not have constant rotating torque.

Even under a condition that the casing 1 and the rotating shaft 2 are both fabricated with accuracy, if the assembly of the casing 1 and shaft 2 has backlash, a dimension of the flow path will be warped. Likewise, the aimed torque cannot be obtained.

In order to control the rotating torque, there is a need to strictly manage the accuracy of finishing and the accuracy of assembling.

Further, in order to adjust the torque to any given value, there is a need to change molds, resulting in an increase in cost.

Alternatively, there is another manner in which fluid such as oil is changed in viscosity to adjust the torque. However, an arbitrary torque cannot be obtained unless oils or the like having different viscosities are blended. In this manner, there is a need to prepare a large number of kinds of oils or the like having different viscosities, resulting in high costs. Further, considerable effort is spent on the choice of proportion of the oil or the like to obtain a required torque.

SUMMARY OF THE INVENTION

It is an object of the present invention to provide a damper having a simple structure and allowing the setting of arbitrary torque with smooth reproducibility.

It is another object of the present invention to provide a method of fabricating a damper having arbitrary torque at low cost.

A damper according to a first aspect of the present invention features a configuration including: a shaft member having a shaft and wings formed on the outer periphery of the shaft; a cylindrical casing relative-rotatably incorporating the shaft member; an oil chamber provided between the outer periphery of the shaft member and the inner periphery of the casing; a protrusion provided on the inner periphery of the casing and slidable on the outer periphery of the shaft; a communicating path passed through the shaft to make the communication between a pair of the adjacent oil chambers out of all the oil chambers individually surrounded by the wings and the protrusions, and having at least one of openings which is to be closed by the protrusion, provided on the casing, within a relative-rotating range of the shaft member.

A second aspect of the present invention features in that one of the openings of the communicating path is formed at a position allowing the one opening to open toward the oil chamber at all times within the relative-rotating range of the shaft member.

According to the second aspect, the shaft member has higher rotating torque only in a region of the rotating range of the shaft member than that in other regions thereof. For example, using such damper for a keyboard cover of a piano, the damper is adapted such that the high-torque region of the rotating range is produced before the cover is closed. Thus, the cover can be prevented from quickly and forcefully closing because of its own weight even after a hand is moved off the cover.

A third aspect of the present invention features in that the protrusions provided on the casing independently close the openings of both ends of the communicating path within the relative-rotating range of the shaft member.

According to the third aspect, it is possible to set the two high-torque regions within the rotating range of the shaft member. This allows, for example, the cover of the piano to independently keep its upright position when the cover is fully opened, and not to fall with a bang at the final time of closing the cover.

A fourth aspect of the present invention features in that the protrusion provided on the casing closes the opening of the communicating path at either one or both of the starting and ending points of a relative rotation of the shaft member.

According to the fourth aspect, it is possible to set the high-torque regions at the starting point and the ending point of rotation.

A fifth aspect of the present invention features in that a plurality of the communicating paths are provided between the pair of adjacent oil chambers.

According to the first aspect to the fifth aspect of the present invention, it is possible to provide a damper having a simple structure and allowing the setting of arbitrary torque with smooth reproducibility.

According to the fifth aspect, it is possible to control a sectional area of the oil flow path by changing the number of communicating paths. For example, if a sectional area of the flow path is adjusted based on the number of communicating paths, the individually communicating paths can be equal in diameter. In this event, varying sectional areas of the flow path can be achieved without changing sizes of perforating tools such as a drill.

A method of fabricating a damper according to a sixth aspect of the present invention features the steps of: molding a cylindrical casing and a shaft member having wings with use of a mold or die; opening a communicating path through the shaft member with use of a perforating tool; and mounting the shaft member in the casing.

According to the sixth aspect, the torque can be changed without changing molds or dies. Therefore, the dampers having arbitrary torque can be fabricated at low cost.

DETAILED DESCRIPTION OF THE PREFERRED EMBODIMENTS

Figure 1A:
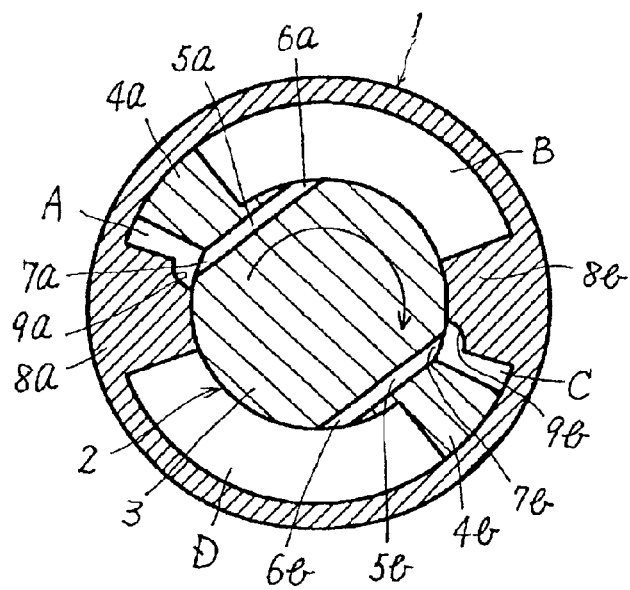
FIGS. 1A, 1B, 1C and 1D are sectional views of a damper of a first embodiment according to the present invention and sequentially illustrate the rotating states of a shaft member, with FIG. 1D illustrating an interrupting state of a communicating path.

FIGS. 1A, 1B, 1C and 1D show a first embodiment according to the present invention.

As illustrated in FIG. 1, a damper of the first embodiment has a tubular casing 1 rotatably incorporating a shaft member 2.

The shaft member 2 is composed of a shaft 3 and a pair of wings 4a, 4b protruding outward from the outer periphery of the shaft 3. The wings 4a, 4b slide on the inner periphery of the casing 1 in conjunction with rotation of the shaft member 2.

In the shaft 3, each of communicating paths 5a, 5b extends between both ends of the wing 4a or 4b near the base of the wing 4a or 4b.

In the casing 1, a pair of protrusions 8a, 8b protrude inward from the inner periphery, and slide on the outer periphery of the shaft 3 when the shaft member 2 rotates.

Each of the protrusions 8a, 8b has an end at which a notch 9a or 9b is formed.

In the damper designed as described above, the wings 4a, 4b and the protrusions 8a, 8b define the space between the shaft member 2 and the casing 1 into oil chambers A to D which are full of oil.

The following explains when the shaft member 2 rotates in the direction indicated with the arrow in FIG. 1.

This explanation is about the movement of the wing 4a because the wings 4a and 4b are symmetrically situated and the protrusions 8a and 8b are symmetrically situated. Rotation of the shaft member 2 is equal to rotation relative to the casing 1.

In the first embodiment, the rotating range of the shaft member of the present invention is from where the wing 4a is in contact with the protrusion 8a until the wing 4a comes into contact with the protrusion 8b.

FIG. 1A illustrates the state in which the wing 4a moves slightly toward the arrow direction from where the left end face of the wing 4a is in contact with the right end face of the protrusion 8a. As the shaft member 2 rotates in the arrow direction from where the left end face of the wing 4a is in contact with the right end face of the protrusion 8a, the oil chamber B situated forward of the rotating direction of the wing 4a has a higher pressure, whereas the oil chamber A situated backward of the wing 4a expands. At this time, communication of the oil chamber B with the oil chamber A through the communicating path 5a allows oil to flow through an opening 6a opened toward the oil chamber B into the oil chamber A via an opening 7a.

In this way, as long as the oil flows smoothly from the oil chamber B to the oil chamber A, the shaft member 2 smoothly rotates.

Figure 1B:
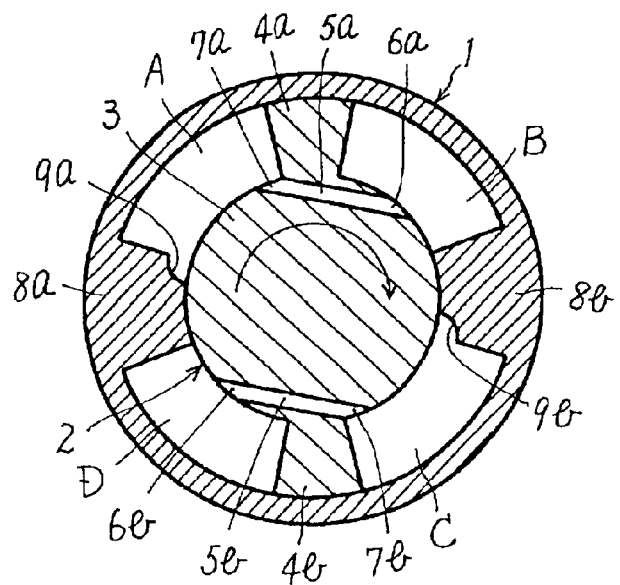
Figure 1C:
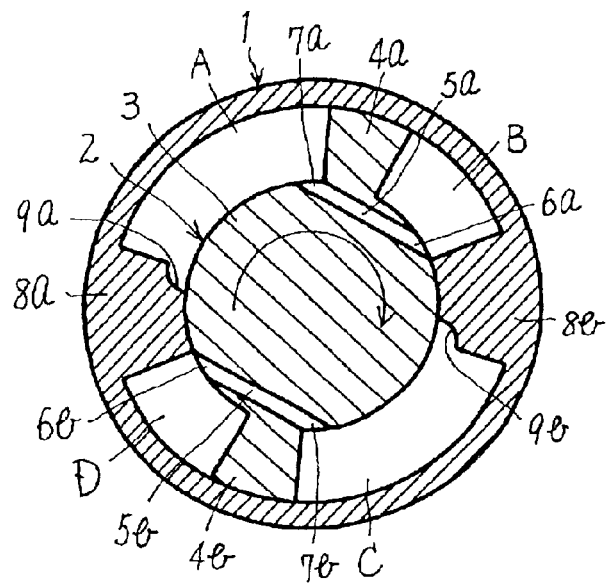

Specifically, during the rotation of the shaft member 2 in the arrow direction as illustrated sequentially from FIGS. 1A, 1B to 1C, the communicating path 5a permits the communication between the oil chamber B and the oil chamber A. Likewise, the communication path 5b concurrently permits the communication between the oil chambers D and C. Hence, the rotating torque is decreased. In other words, the shaft member 2 rotates with low resistance.

Figure 1D:
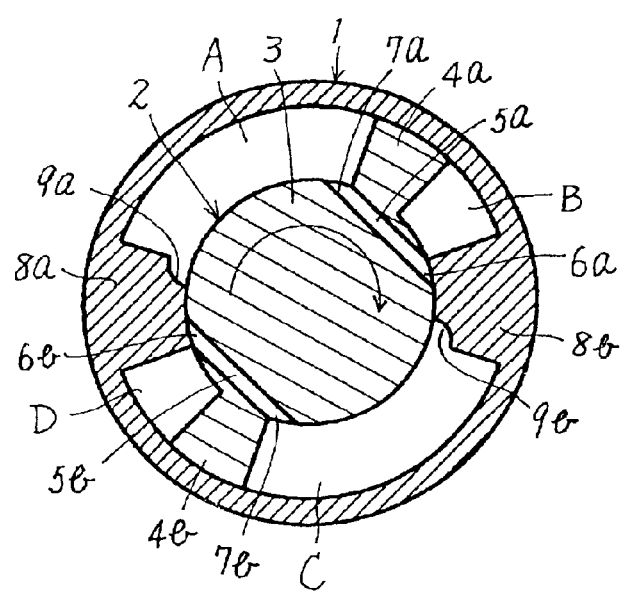

However, as the shaft member 2 is further rotated as illustrated in FIG. 1D, the protrusion 8b closes the opening 6a corresponding to the leading end of the communicating path 5a. During the closing of the opening 6a, the shaft member 2 is further rotated in the arrow direction, whereupon the oil chamber B has a higher pressure. Accordingly, the oil in the oil chamber B flows into the oil chamber A under lower pressure through the sliding face between the casing 1 and the wing 4a or the sliding face in the axial direction. Alternatively, the oil in the oil chamber B flows into the oil chamber C under lower pressure through the sliding face between the protrusion 8b and the shaft 3. In this way, due to the sliding face serving as a flow path for oil, the flow resistance is increased, resulting in an increase in rotating torque.

Consequently, it is possible to rotate the shaft member 2 with high resistance from the state illustrated in FIG. 1D until the wing 4a comes into contact with the protrusion 8b.

As the opening 6a is gradually decreased in the opening area during the process in which the opening 6a is closed by the protrusion 8b, the torque increases gradually.

In short, with the damper, when the shaft member 2 is rotated in the arrow direction from the state illustrated in FIG. 1A, the rotation resistance starts out low and becomes gradually higher from before the ending point.

On the other hand, when the shaft member 2 is rotated in the opposite direction of the arrow from where the wing 4a is in contact with the protrusion 8b, the rotation has high resistance until the state illustrated in FIG. 1C in which the opening 6a having been closed by the protrusion 8b is released toward the oil chamber B. After that, the rotation has low resistance until the wing 4a comes into contact with the protrusion 8a.

During the contact of the wing 4a with the protrusion 8a, the notch 9a formed on the end of the protrusion 8a meets the other opening 7a of the communicating path 5a to allow the communicating path 5a to continuously open. In short, the other opening 7a of the communicating path 5a is never closed. The above configuration allows an increase in rotating torque only in the neighborhood of either the starting point or the ending point of the rotation.

Such damper can be used for a hinge of a keyboard cover of a piano. In this use, the damper is mounted so as to rotate the shaft in a direction in which the rotating torque increases just before the keyboard cover is closed. This prevents the keyboard cover from quickly and forcefully falling if the keyboard cover is released from a hand during the closing.

Further, with the damper according to the first embodiment, the rotating torque can be adjusted by use of the flow resistance of the communicating path 5a making the communication between the oil chamber A and the oil chamber B. Due to the fact that the flow resistance depends on a sectional area of the flow path, the torque can be adjusted by adjusting a sectional area of the communicating path 5a.

The external shape of the casing 1 and shaft member 2 is molded using a mold or die. After that, the communicating path is formed so as to have the flow-path sectional area with accuracy to provide any given torque. Therefore, it is possible to vary torque by means of changing a bore diameter of the communicating path without changing the molds or dies as in the prior art.

When the communicating paths 5a, 5b are formed through the molding using a slid pin, variations in the dimensions of the communicating paths may occur. However, the variations can be corrected by using a drill or the like in the finishing.

FIGS. 2A, 2B, 2C and 2D illustrate a second embodiment which is different from the first embodiment in that a notch is provided around one of the openings of each of the communicating paths 5a, 5b so as to be continued from the corresponding base of each of the wings 4a, 4b, the notch serving as each of openings 10a, 10b. The casing 1 includes a pair of protrusions 11a, 11b without having the notches 7a, 7b in the first embodiment of FIG. 1.

The remaining configuration is the same as that in the first embodiment, and the same components as those in the first embodiment are designated the same reference numerals.

In the damper of the second embodiment, the openings 10a, 10b each of which is one of the two openings extend to the bases of the wings 4a, 4b, respectively. Therefore, for example, while the wing 4a is in contact with the protrusion 11a, or until the capacity of the oil chamber A disappears, the opening 10a opens toward the oil chamber A. In other words, the openings 10a, 10b, each of which is one of the two openings, are not closed within the rotating range of the shaft member 2.

Accordingly, the shaft member 2 starts the rotation in the arrow direction from where the wing 4a is in contact with the protrusion 11a. During the states sequentially illustrates in FIGS. 2A, 2B and 2C, the communicating path 5a makes the communication between the oil chamber A and the oil chamber B while the communicating path 5b makes the communication between the oil chambers C and D. Thus, the shaft member 2 has lower rotating torque during the above period, and rotates with low resistance in the arrow direction.

Figure 2A:
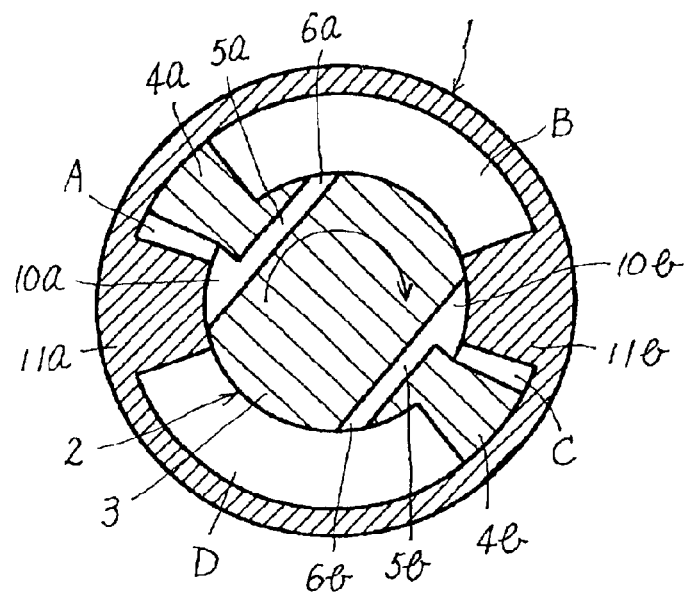
FIGS. 2A, 2B, 2C and 2D are sectional views of a damper of a second embodiment and sequentially illustrate the rotating states of a shaft member, with FIG. 2D illustrating an interrupting state of a communicating path.
Figure 2B:
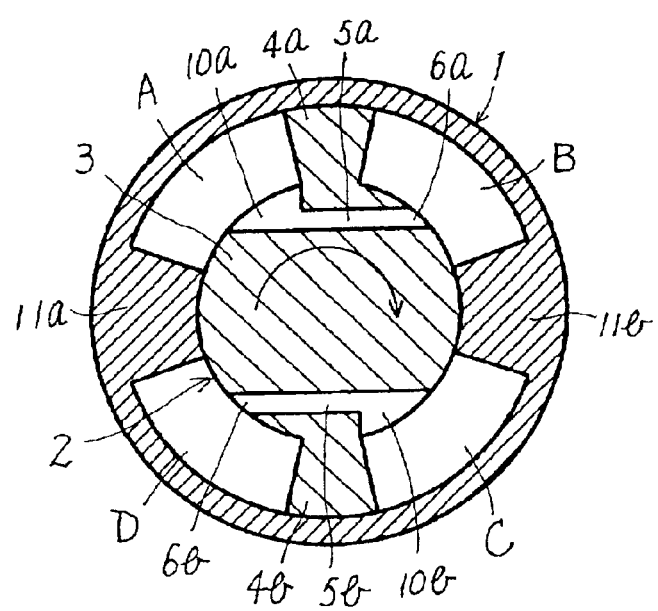
Figure 2C:
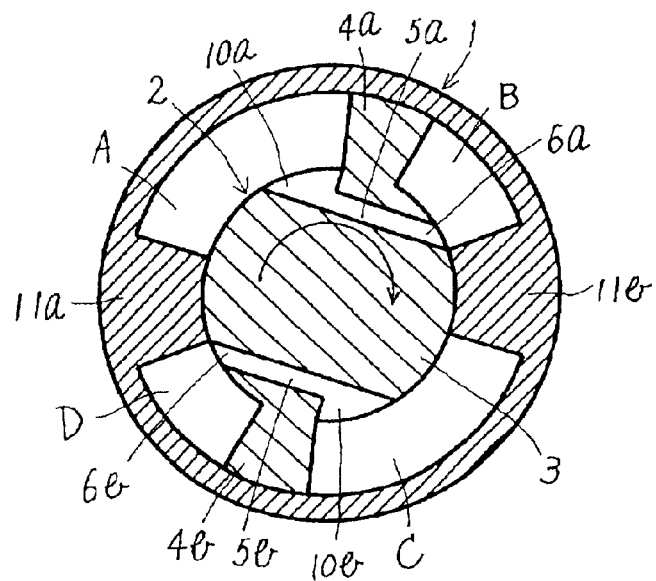
Figure 2D:
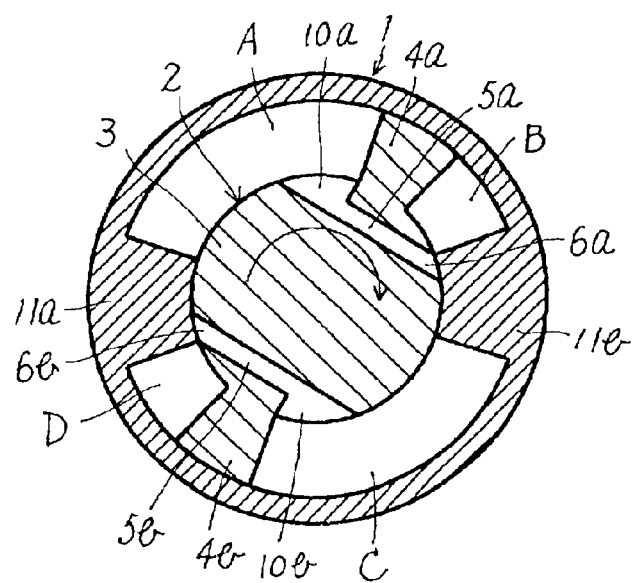
Figure 3A:
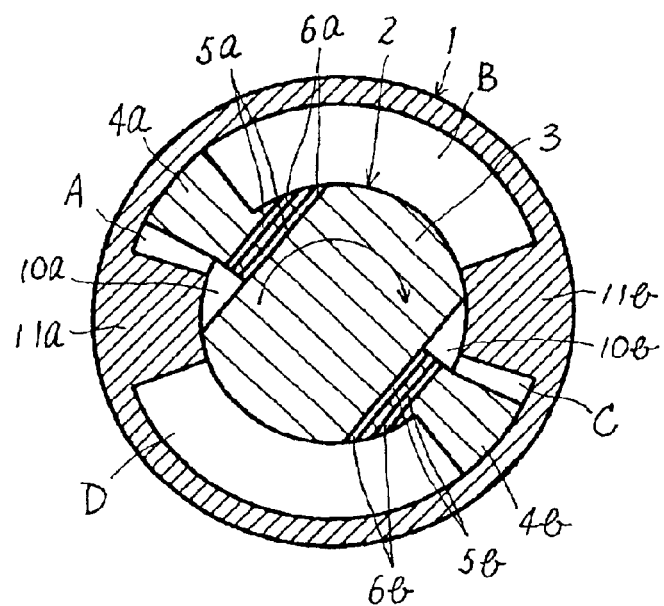
FIGS. 3A, 3B, 3C and 3D are sectional views of a damper of a third embodiment and sequentially illustrate the rotating states of a shaft member, with FIG. 3D illustrating an interrupting state of a communicating path.
Figure 3B:
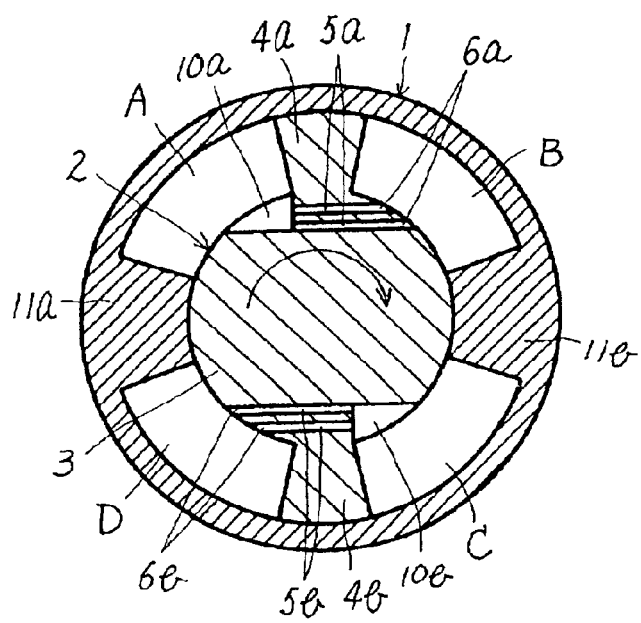
Figure 3C:
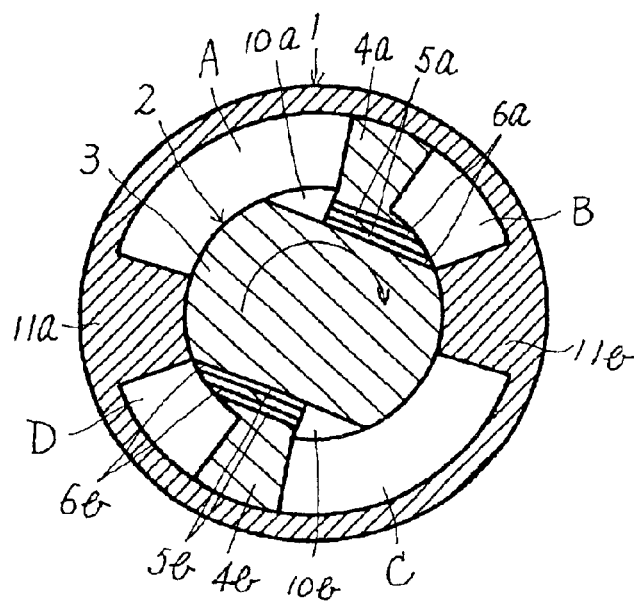
Figure 3D:
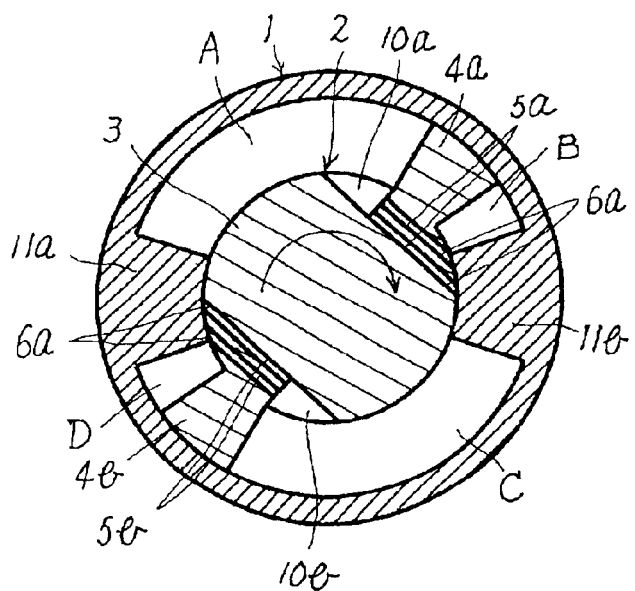

From the state illustrated in FIG. 2C, the shaft member 2 further rotates in the arrow direction, whereupon the opening 6a of the communicating path 5a is closed by the protrusion 11b. When the shaft member 2 is further rotated in the arrow direction after closing of the opening 6a, the oil in the oil chamber B flows into the oil chamber A or C through the sliding face between the casing 1 and the shaft member 2. At this time, the flow resistance of the flow path is high, which results in high rotating torque. It should be noted that at the time when the opening 6a of the communicating path 5a is closed, the opening 6b of the other communicating path 5b is closed by the protrusion 11a.

In this way, with the damper according to the second embodiment, when the wing 4a rotates from the protrusion 11a to the protrusion 11b in the direction illustrated with the arrow in FIG. 2, the rotation resistance is low initially and higher near the ending point.

FIGS. 3A, 3B, 3C and 3D illustrate a third embodiment which differs from the second embodiment in that each of the communicating paths 5a, 5b provided in the shaft 3 is constructed of a plurality of small-diameter through-holes. The remaining configuration is the same as that in the second embodiment. A set of the through-holes has one end connecting to the notch provided in the shaft 3 so as to form each of the large openings 10a, 10b.

Accordingly, the damper according to the third embodiment has the operation similar to the damper of the second embodiment illustrated in FIG. 2.

When the communicating path is constructed of a plurality of through-holes as in the third embodiment, the sectional area of the communicating path is the sum of the sectional areas of the plurality of the through-holes. Hence, the sectional area of the communicating path 5a can be adjusted by controlling the number of through-holes.

Figure 4A:
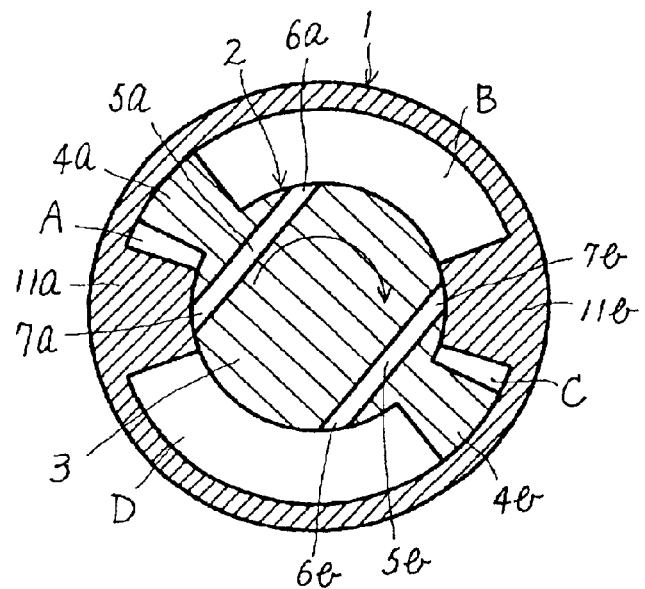
FIGS. 4A, 4B, 4C and 4D are sectional views of a damper of a fourth embodiment and sequentially illustrate the rotating states of a shaft member, with FIGS. 4A and 4D illustrating an interrupting state of a communicating path.
Figure 4B:
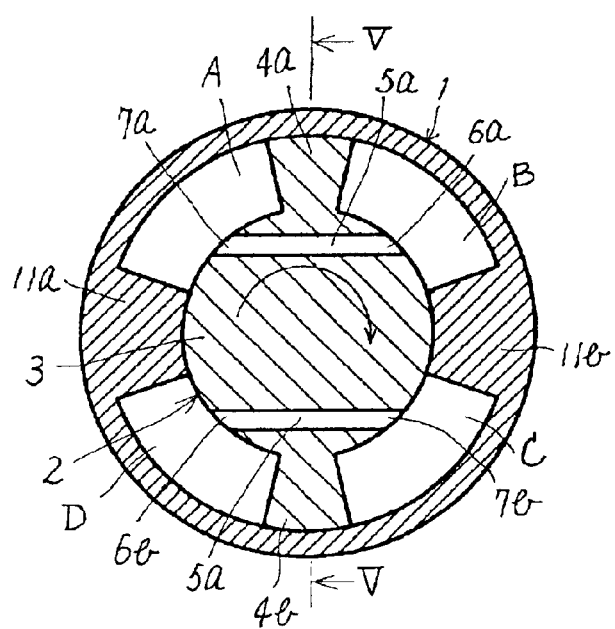
Figure 4C:
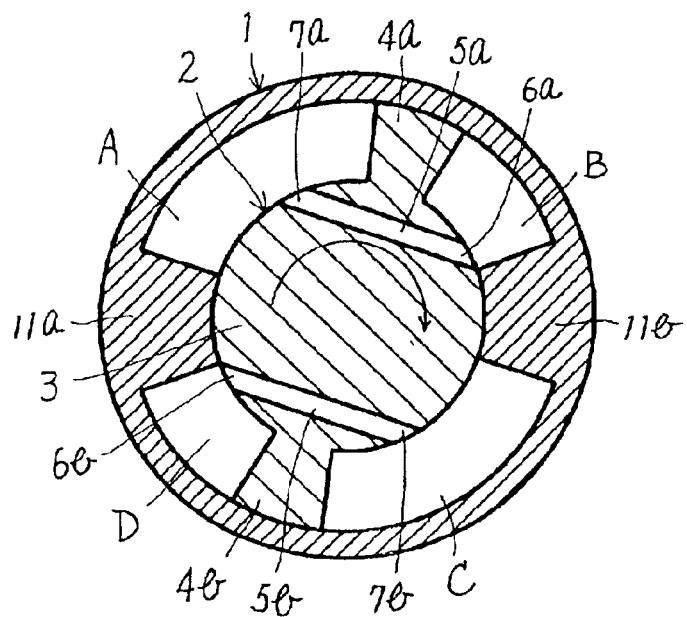
Figure 4D:
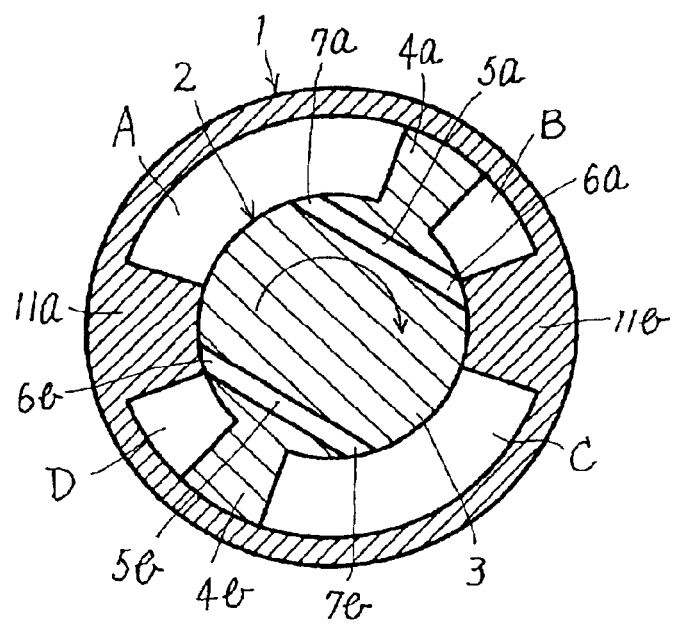
Figure 5:
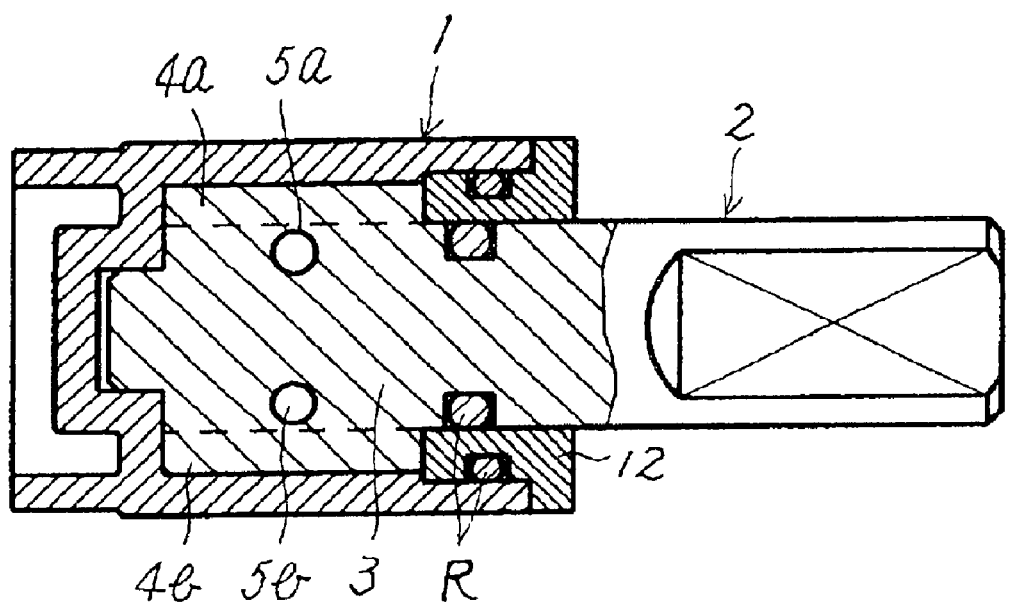
FIG. 5 is a sectional view taken along the V—V line in FIG. 4B.

FIGS. 4A, 4B, 4C and 4D and FIG. 5 illustrate a fourth embodiment which differs from the second embodiment in that the shaft does not include the notch and the two openings of each of the communicating paths 5a, 5b are formed at a distance from the corresponding base of the wing 4a or 4b. The remaining configuration is the same as that in the second embodiment. FIG. 5 is a sectional view of the shaft member 2 in the axial direction.

As described above, both openings 6a, 7a of the communicating path 5a are spaced from the wing 4a and both protrusions 11a, 11b provided on the inner periphery of the casing 1 do not have notches. Accordingly there are the times when the openings 6a, 7a of the communicating path 5a are closed by the corresponding protrusions 11b, 11a within the rotating range of the shaft member 2.

Specifically, for the rotation starting from the starting point where the wing 4a is in contact with the protrusion 11a in the direction indicated with the arrow in FIG. 4, in FIG. 4A, the opening 7a is closed by the protrusion 11a, or the communicating path 5a does not make the communication between the oil chamber A and the oil chamber B. Therefore, as the shaft member 2 rotates, the oil in the oil chamber B has a higher pressure, and flows into the oil chamber A and the oil chamber C through the sliding face between the casing 1 and shaft member 2. The flow resistance at this time is high and the rotating torque is high.

The shaft member 2 further rotates, then the opening 7a separates from the protrusion 11a, whereupon the oil chamber A and the oil chamber B are communicated as illustrated in FIG. 4B. The oil in the oil chamber B flows into the oil chamber A through the communicating path 5a. At this time, the flow resistance is low so that the rotating torque is low.

Up to the state illustrated in FIG. 4C, the communicating path 5a makes the communication between the oil chamber B and the oil chamber A. Hence, the rotating torque is low.

From the above state, as the shaft member 2 further rotates in the arrow direction, the opening 6a situated toward the front in the rotating direction overlays the protrusion 11b, to decrease gradually in area of the opening. Accordingly, the flow resistance from the oil chamber B to the oil chamber A increases gradually, resulting in an increase in the rotating torque. Then, as illustrated in FIG. 4D, when the opening 6a is closed completely by the protrusion 11b, the flow resistance is at the maximum and also the rotating torque is at the maximum.

It should be noted that as in the case of the communicating path 5a, the other communicating path 5b makes and closes the communication from the oil chamber D to the oil chamber C.

In short, with the damper according to the fourth embodiment, within the range where the wings 4a, 4b move between the protrusions 11a and 11b, the rotating torque is increased at both the starting and ending points of the movement.

Such damper is convenient for use for, for example, a seat and cover of a toilet. When the toilet seat and cover are raised and released from a hand, the rotating torque is high to allow the seat and cover to independently keep their upright positions not to move down. Even when the hand is moved off the seat and cover while lowering them, the seat and cover fall slowly because the rotating torque increases from when they approach the lowermost positions. Thus they do never fall with a bang.

As described above, when the seat and cover are raised to their uppermost position, if the seat and cover take an upright position or a slightly over upright position, they completely stand up by themselves and do not fall even if the hand is moved off them. The seat and cover are slightly moved from the above state in the lowering direction by hand, whereupon the rotating torque decreases from its high value and the rotation starts for lowering the seat and cover.

As in the first to third embodiments, in the fourth embodiment, by simply changing a sectional area of the communicating paths 5a, 5b, the rotating torque can be adjusted. Therefore, the adjustment for torque is readily implemented as compared with a damper of which all components are molded using molds or dies. Further, because of a very simple shape of a portion to be molded, there is no need for making a mold or die of complicated configuration.

FIG. 5 is a sectional view taken along the V—V line of FIG. 4B. Referring to FIG. 5, the aforementioned damper has the shaft member 2 mounted in the casing 1 and a cap 12 for closing the opening of the casing 1. All the dampers of the first to third embodiments have the same configuration in which the shaft member 2 is mounted in the casing 1 as described above. Reference alphabet R in FIG. 5 represents an O-ring.

As illustrated in FIG. 5, each of the communicating paths 5a, 5b of the fourth embodiment is circular in sectional shape, but a sectional shape of the communicating path is not limited to a circular shape. The communicating path may have various shapes as illustrated in FIGS. 6A to 6D by way of example.

Figure 6A:
FIGS. 6A, 6B, 6C and 6D are diagrams respectively illustrating examples of a sectional shape of the communicating path.
Figure 6A:

In FIGS. 6A to 6D, assuming the arrow direction is a rotating direction of the shaft member 2, in the case of a horizontally oriented rectangle as illustrated in FIG. 6A, a rate of change of a sectional area, or flow resistance, with respect to a rotational angle of the shaft member 2 is higher.

Figure 6B:
Figure 6B:

In the case of a vertically oriented opening as illustrated in FIG. 6B, opposite to the case of FIG. 6A, a rate of change of the flow resistance is lower and the changing zone extends.

Figure 6C:
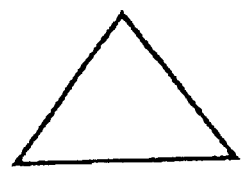
Figure 6C:
Figure 6D:
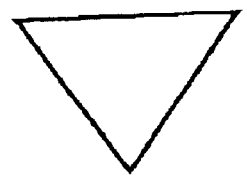
Figure 6D:

In the case of a triangle as illustrated in FIGS. 6C and 6D, a rate of change of the flow resistance varies as the shaft member 2 rotates.

By changing the sectional shape of the communicating path as described above, a rate of change of the flow resistance can be varied.

However, in the case of circular cross-section, since a hole can be opened with a drill, the working process is simple.

In the foregoing first to fourth embodiments, the communicating paths 5a, 5b are respectively provided for making the communications between the oil chambers A and B and between the oil chambers C and D which are defined by the wings 4a, 4b of the shaft member 2. However, the communicating paths may be provided for making the respective communications between the oil chambers B and C and between the oil chambers D and A which are defined by the protrusions of the casing 1. This can also provide the damper facility.

For example, FIGS. 7A, 7B, 7C and 7D illustrate a fifth embodiment in which each of the communicating paths 5a, 5b is not provided between the oil chambers defined by each of the wings 4a, 4b. The fifth embodiment is different in the above point from the fourth embodiment, and the same in the remaining configuration as that of the fourth embodiment.

Figure 7A:
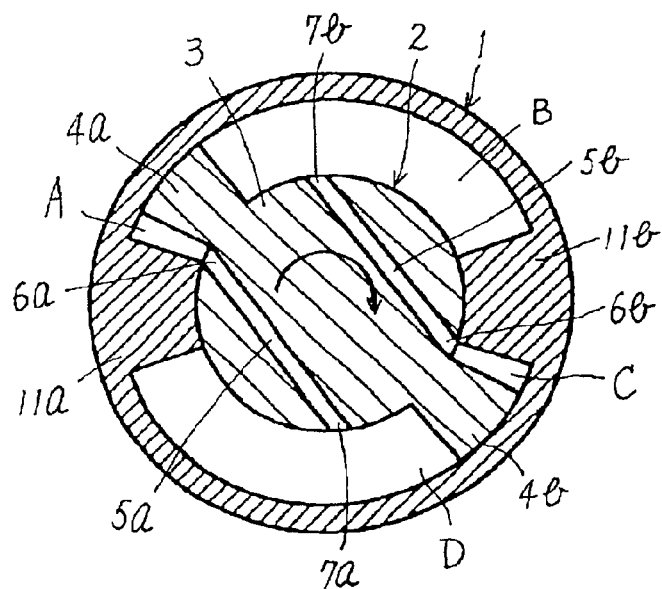
FIGS. 7A, 7B, 7C and 7D are sectional views of a damper of a fifth embodiment and sequentially illustrate the rotating states of a shaft member, with FIG. 7D illustrating an interrupting state of a communicating path.
Figure 7B:
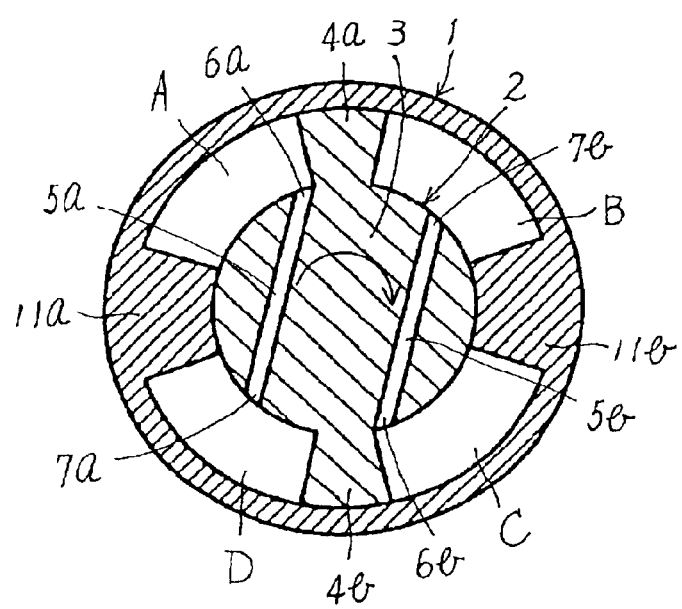
Figure 7C:
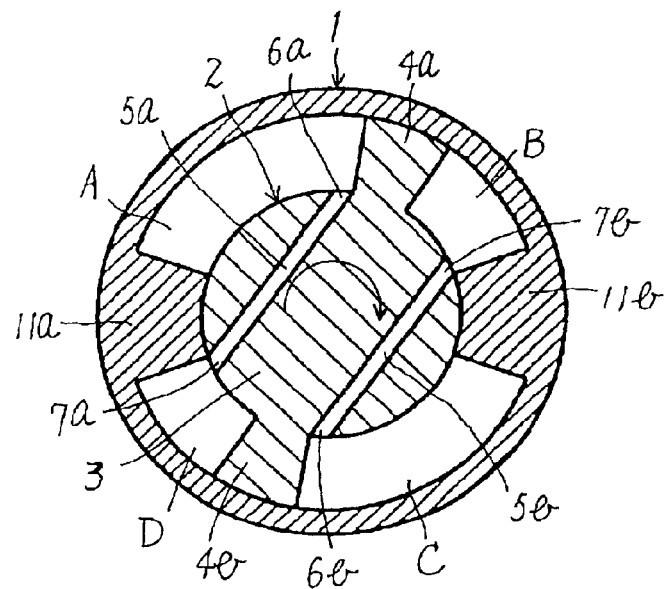
Figure 7D:
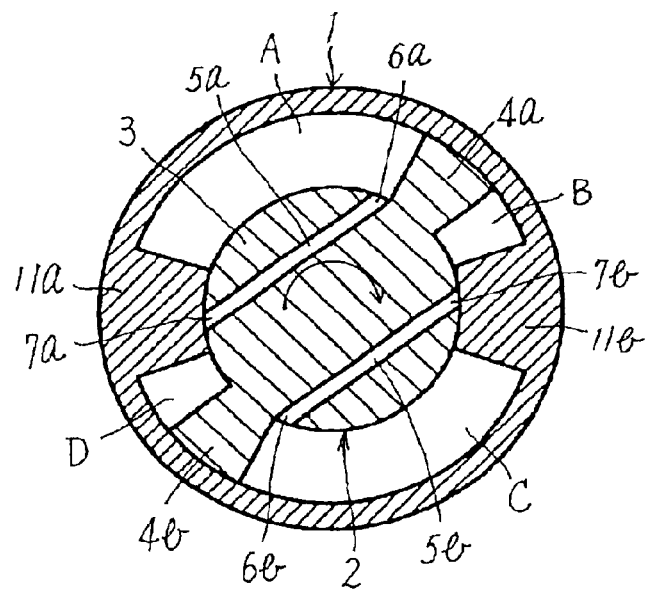

Specifically, in FIGS. 7A, 7B and 7C, the communicating path 5a makes the communication between the higher-pressure oil chamber D and the lower-pressure oil chamber A, while the other communicating path 5b makes the communication between the higher-pressure oil chamber B and the lower-pressure oil chamber C. Thus, during the period illustrated from FIGS. 7A through 7C, the shaft member 2 has low rotating torque. Then, in FIG. 7D, the opening 7a of the communicating path 5a is closed by the protrusion 11a and the opening 7b of the communicating path 5b is closed by the protrusion 11b. Thus, the shaft member 2 has high rotating torque.

In the foregoing first to fourth embodiments, a pair of wings 4a, 4b are provided. However, even if one of the wings 4a, 4b is provided, the same effects of the foregoing embodiments can be obtained. When the single wing is provided, the casing may have also one protrusion.

Further, in the foregoing embodiments, the rotating range of the shaft member is confined by contact between the protrusions of the casing and the wings. However, if there is a need for controlling the rotating range of the shaft member 2, a stopper aside from the protrusions may be provided to stop the movement of the wings. The stopper mechanism can be achieved by any given configuration.

If the rotation is controlled by the stopper before the protrusion closes a specific opening of the communicating path, one of the openings can be opened at all times even though no notches are provided in the protrusion and the shaft as described in the first to third embodiments.

FIGS. 8A, 8B, 8C and 8D illustrate a sixth embodiment in which the single wing 4a is provided on the shaft 3 and the single protrusion 11a is provided in the casing 1. Through the shaft 3, the two communicating paths 5a, 5b are passed. The remaining components similar to those in the fourth embodiment are designated with the same reference numerals. However, the number of wing is one, and the number of oil chambers defined by the wing 4a is only two, the oil chambers A, B.

Similar to other embodiments, FIGS. 8A to 8D sequentially illustrate the states when the shaft member 2 rotates in the arrow direction.

Figure 8A:
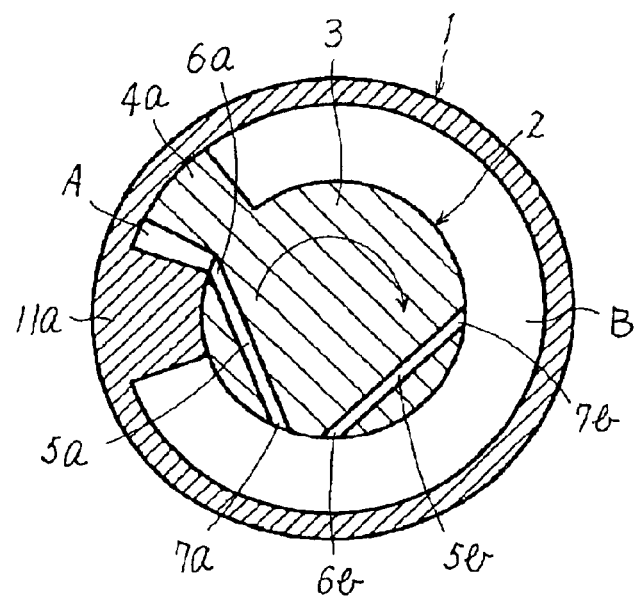
FIGS. 8A, 8B, 8C and 8D are sectional views of a damper of a sixth embodiment and sequentially illustrate the rotating states of a shaft member, with FIGS. 8B to 8C illustrating an interrupting state of a communicating path.

In FIG. 8A, the communicating path 5a makes the communicating between the oil chambers A and B. From the above state to the state illustrated in FIG. 8B, the shaft member 2 has low rotating torque.

Figure 8B:
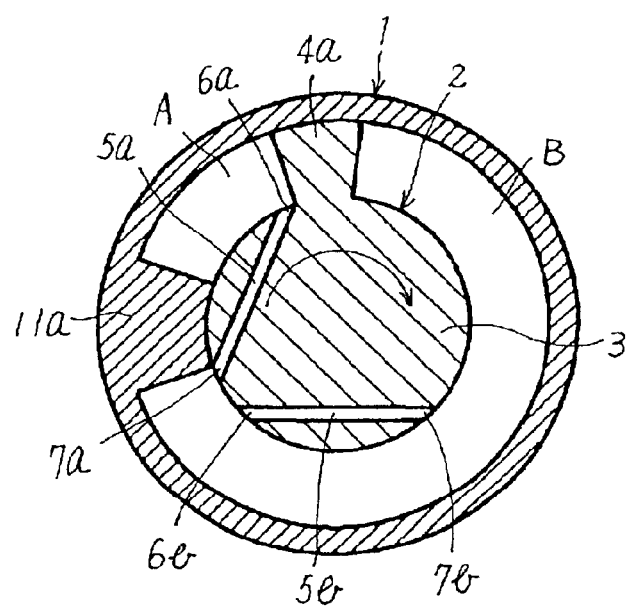
Figure 8C:
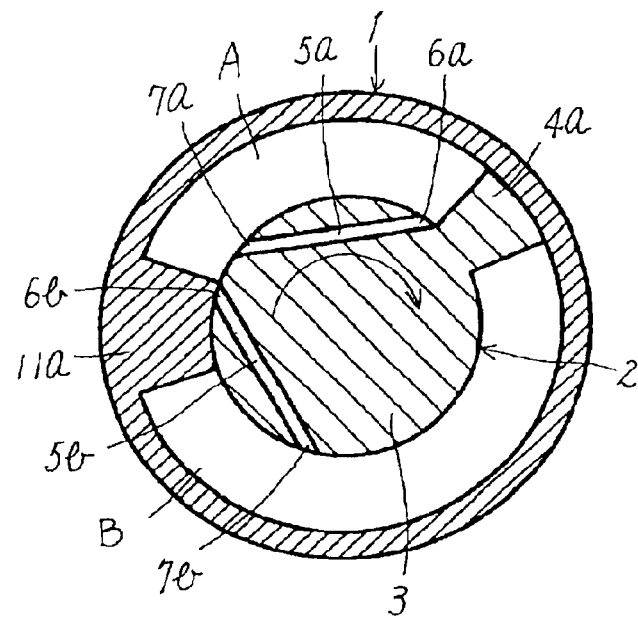
Figure 8D:
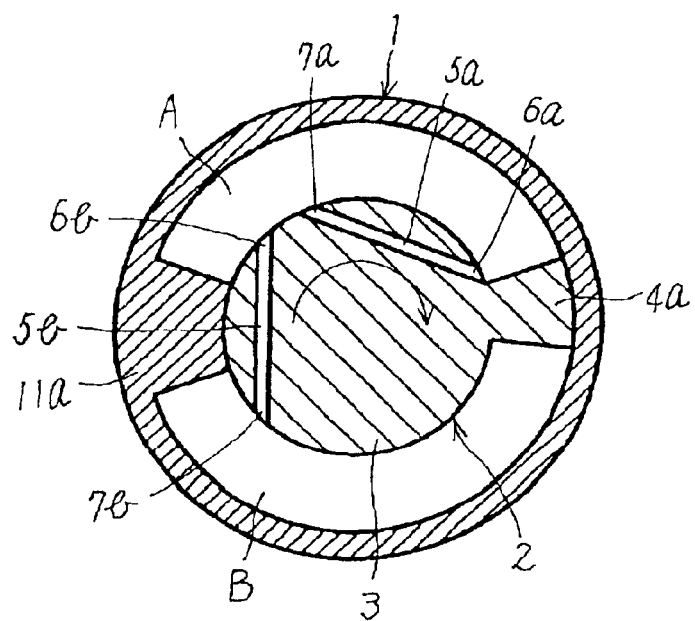
Figure 9:
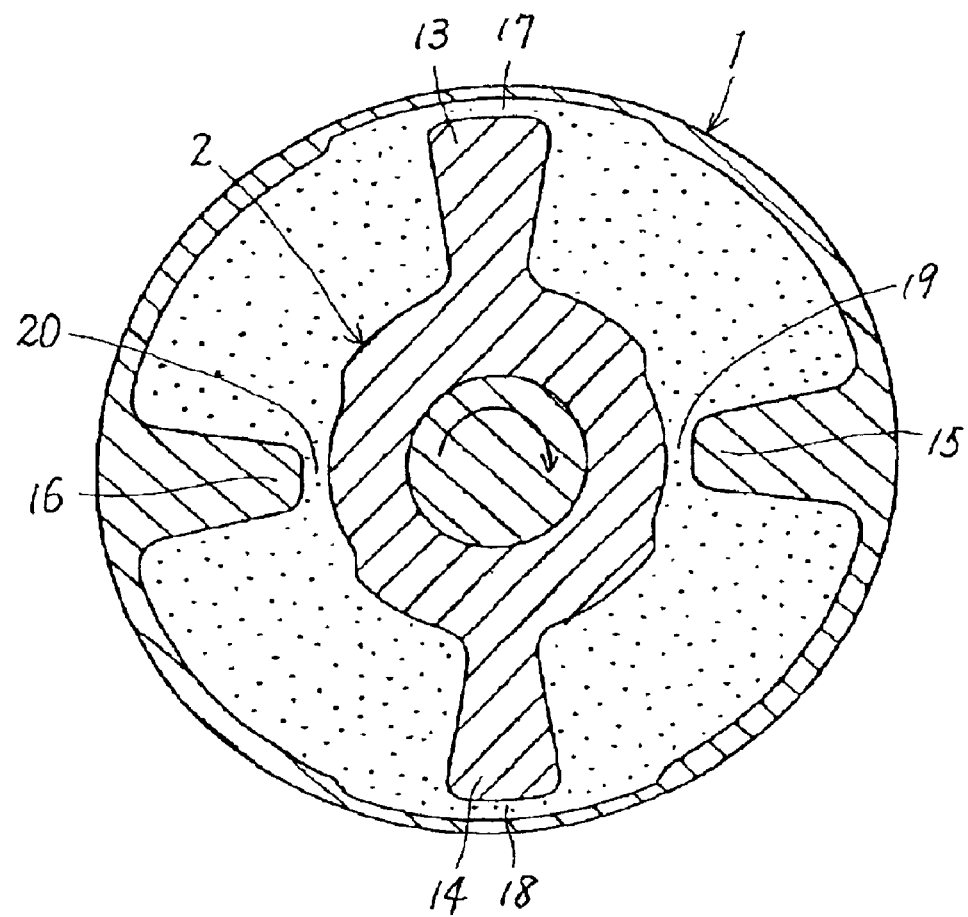
FIG. 9 is a sectional view of an example of prior art.

In FIG. 8B, the opening 7a of the communicating path 5a is about to overlay the protrusion 11a. From the above state, the shaft member 2 further rotates in the arrow direction, whereupon the opening 7a overlays the protrusion 11a to be closed, leading to a high-torque rotation region. The high-torque rotation region, or the state in which the communicating path between the oil chambers A and B is closed, continues to the state illustrated in FIG. 8C. Upon further rotating of the shaft member 2, as illustrated in FIG. 8D, the opening 6b of the communicating path 5b is opened toward the inside of the oil chamber A to allow the communicating path 5b to make the communication between the oil chambers A and B. Thus the shaft member 2 has low rotating torque. The low-torque rotation region continues until the opening 7b of the communication 5b which is situated toward the back in the rotating direction is closed by the protrusion 11a.

In short, the damper of the sixth embodiment has low torque in the first place, low torque in the second place, high torque in the next place, and low torque in the last place as sequentially illustrated in FIGS. 8A, 8B, 8C and 8D, respectively.

As described above, according to the damper of the present invention, the magnitude of rotating torque can be adjusted by adjusting a sectional area of the communicating path. Further, timing of producing high torque can be variously selected by means of changing the number of communicating paths, positions of the openings corresponding to both ends of the communicating path, or the like.

| EXPLANATION OF REFERENCE NUMERALS | |
|---|---|
| 1 | CASING |
| 2 | SHAFT MEMBER |
| 3 | SHAFT |
| 4a, 4b | WING |
| 5a, 5b | COMMUNICATING PATH |
| 6a, 6b, | OPENING |
| 7a, 7b | OPENING |
| 10a, 10b | OPENING |
| 8a, 8b | PROTRUSION |
| 11a, 11b | PROTRUSION |
| A, B, C, D | OIL CHAMBER |

We claim:

1. A damper comprising:

a rotatable shaft member having a shaft and wings formed on an outer periphery of the shaft;

a cylindrical casing incorporating said shaft member;

a plurality of oil chambers defined between the outer periphery of said shaft member and an inner periphery of said casing;

at least one protrusion provided on the inner periphery of said casing, said at least one protrusion structured and arranged so that it is slides over an outer periphery of said shaft as said rotatable shaft member rotates; and at least one communication path having a first open end that communicates with one of said plurality of oil chambers and a second open end that communicates with another one of said plurality of oil chambers, said communication path passing through said shaft to enable communication between two adjacent oil chambers of said plurality of oil chambers, wherein said at least one protrusion is structured and arranged so that as said rotatable shaft member rotates said protrusions closes one of said first and second open ends of said communication path, within a relative-rotating range of said shaft member.

2. The damper according to claim 1 wherein one of said first and second open ends of said communication path is formed at a position allowing the one opening to remain in an open position relative to an oil chamber at all times within the relative-rotating range of said shaft member.

3. The damper according to claim 1 wherein said at least one protrusion provided on said casing comprises a first and second protrusion, said first and second protrusion each being structured and arranged to independently close a respective one of said first and second open ends of said communication path within the relative-rotating range of said shaft member.

4. The damper according to claim 1 wherein said at least one protrusion provided on said casing closes one of said first and second open ends of said communication path at either one or both of the starting and ending points of a relative rotation of said shaft member.

5. The damper according to claim 1 wherein a plurality of said communicating paths are provided between a pair of the adjacent oil chambers.

* * * * *